Patented Feb. 1, 1944

2,340,357

UNITED STATES PATENT OFFICE 2,340,357

PROCESS FOR TREATING FABRICS

Howard A. Young, Westfield, N. J., assignor to United States Rubber Company, New York, N. Y., a corporation of New Jersey No Drawing. Application October 2, 1941, Serial No. 413,304

16 Claims. (Cl. 117—163)

This invention relates to a process for treating fabrics and more particularly to a process for treating fabrics with latex compositions.

This is a continuation-in-part of application Serial No. 377,322, filed February 4, 1941.

In the Teague and Brewster Patent No. 1,845,569 there is disclosed a process for slowly precipitating rubber in the form of discontinuous small particles from a dilute aqueous dispersion of rubber onto fabrics, such as knitted stockings and the like. In my prior Patent No. 2,173,244 there is disclosed a process for gradually depositing rubber particles on fabric by treatment with latex compositions which gradually exhaust their dispersed rubber particles on the fabric when the fabric is permitted to remain in contact with a bath of the latex composition. The dispersed rubber particles in the latex compositions as disclosed in these patents gradually deposit on the fabric, and other suspended particles of compounding materials, as for example, sulphur and zinc oxide, also deposit from the latex so that during or after drying of the latex treated fabric the rubber particles may be vulcanized in the usual manner. With such a gradual deposition of rubber particles from the aqueous medium, the fabric material largely retains the "feel" of untreated material. Since the rubber particles and particles of compounding ingredients deposit as separate entities in these prior processes, it is necessary to carefully control the deposition process by even distribution of all particles so that the proportion of compounding ingredients to rubber in all parts of the deposit will be the optimum proportion of the latex formulation.

The present invention is an improvement over these prior processes of treating fabric wherein the rubber as it is deposited from the treating bath onto the fabric will inherently contain a representative proportion of all the compounding ingredients in the bath.

According to the present invention, the fabric is associated with a dilute bath of an agglomerated or flocculated latex composition in which the rubber agglomerates or flocs are in the form of composite particles comprising rubber and compounding ingredients, such as sulphur and zinc oxide. The treating bath of agglomerated rubber particles should contain sufficient protective to prevent the rubber agglomerates from completely coagulating into a coherent lump but insufficient protective to prevent the agglomerates from depositing on the fabric when in contact therewith. When the colloidal rubber particles in a latex composition are agglomerated, as by addition of an agglomerating agent in a known manner, each rubber agglomerate or floc will contain a representative portion of all the bath ingredients, including the vulcanizing ingredients, such as sulphur and zinc oxide, so that when these rubber agglomerates are deposited on a fabric, each deposited floc will contain the necessary agents for vulcanizing the rubber content thereof. Various agglomerating or flocculating agents for latex particles are known and the preparation of an agglomerated rubber composition per se forms no part of the present invention. The agglomerates in such baths are clearly macroscopic, and it is possible to see them separating from the aqueous medium in the form of grain-like particles, as for example, when some of the agglomerated latex bath is placed in the hollow of the hand, or when the hand is submerged below the surface of the bath. The particles which are readily separable from the aqueous medium on standing are composite particles comprising rubber and their representative portions of compounding ingredients, so that when these agglomerates of composite particles deposit on the fabric, all particles will contain the necessary ingredients to give them the properties desired to be imparted to the rubber deposit by the compounding ingredients. With sulphur and zinc oxide as compounding ingredients for vulcanization, the specific gravity of the composite rubber particles which separate on standing is greater than one so that the rubber agglomerates containing sulphur and zinc oxide settle out or sink on standing. On the other hand, when the rubber particles are of colloidal size in a compound containing sulphur and zinc oxide, the sulphur and zince oxide may settle out, while the rubber particles remain dispersed in the serum.

Various known methods are available for agglomerating the rubber particles and various known latex stabilizers may be used as protectives for the agglomerates. The rubber particles may be agglomerated by a process akin to "salting out," as by the addition of relatively large amounts of monovalent salts of strong acids, for example, ammonium sulphate to the latex compound in the presence of a protein, such as gelatin, and the protective for the agglomerates. Acidification of the latex bath, or treatment with a polyvalent metal salt, in the presence of a suspension of clay particles and the protective for the agglomerates may also be used to agglomerate the rubber particles. Another method of agglomerating the rubber particles is to precipitate a flocculant salt or acid in the latex, as by precipitating a polyvalent metal silicate or silicic acid gel in the protected latex. Various well known latex protectives or stabilizers may be used to prevent the agglomerates in the bath from completely coagulating into a coherent mass. The amount of stabilizer necessary to protect the agglomerates will depend on the protective used, the method of agglomeration, and the temperature and concentration of the bath, but in any given case may readily be determined empirically. Large excess of stabilizer over that necessary to prevent complete coagulation should be avoided, as the greater the amount of stabilizer added in excess of that needed to prevent complete coagulation, the slower will be the deposition of the rubber particles on the fabric. The usual well known stabilizers for latex may be used to protect the rubber agglomerates in the process of the present invention. Examples of such common latex protectives are certain compounds of carboxyl (R—COOM), sulphonic (R—SO$_3$M), sulphuric (R—SO$_2$M), or phenolic (R—OM) groups, or of ethereal sulphuric (RO.SO$_3$M), radicals, where the R may have a straight chain or ring structure, and may contain substituent halogen, amine, nitro or hydroxyl groups, and the M may be an alkali metal, hydrogen or ammonium radical. I have found very satisfactory in the present invention, protectives having the general formula R—SO$_3$M, where R represents an organic radical containing at least one group containing more than 8 carbon atoms and M represents alkali metal, hydrogen or ammonium radical. Various commercial stabilizers having this general formula R—SO$_3$M are illustrated below with reference to various classifications of the radical R:

(1) Where R is an alkoxy group producing, as for example, various compounds from $$C_{10}H_{21}O—SO_3Na$$

to $C_{18}H_{37}O—SO_3Na$, known commercially under the trade names Gardinol, Duponol, Aquarex D, Orvus WA.

(2) Where R is an alkyl group producing, as for example in the formulae $C_{12}H_{25}—SO_3Na$ and $C_{16}H_{33}—SO_3Na$, lauryl sodium sulphonate and cetyl sodium sulphonate, respectively.

(3) Where R is a mixed ether of long and short chain aliphatic groups, as for example in the compound $C_{17}H_{33}—O—C_2H_4—SO_3Na$ believed to be the material known commercially as Nacconol LA.

(4) Where R is an alkyl ester of a long chain fatty alcohol, as for example in the compound

known commercially by the trade names Igepon A and Arctic Syntex A.

(5) Where R is a glycol ester of a long chain fatty alcohol, as for example in the formula

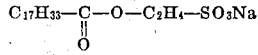

(6) Where R is an alkyl substituted amid of a fatty acid, as for example in the compounds

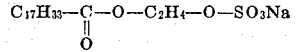
and
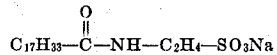

believed to be the commercial products Igepon T and Igepon TF, respectively.

(7) Where R is an alkyl substituted aromatic radical as in various commercial compounds having the formula

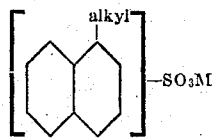

as for example, the sodium salts of alkyl naphthalene sulphonic acid, known under the trade names Nekal; Alkanol; a free alkyl naphthalene sulphonic acid, known commercially as Leonil SBS; the potassium salt of an alkyl naphthalene sulphonic acid known under the trade name Eunaphthol K.

(8) Where R is a hydroaromatic radical, as for example in the compound

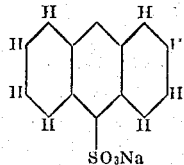

known under the trade name Octation. Also where R is a hydroaromatic radical as in various commercial compounds having the formula

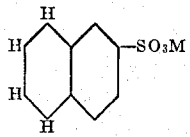

as for example, where M is sodium as in Alkanol S and Mayamin; where M is potassium as in Mayaminkalium; and where M is ammonium as in Mayammonium.

(9) Where R in the formula R—SO$_3$—M is the radical

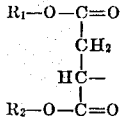

in which one of R$_1$ and R$_2$ may be an alkyl radical from $C_3H_7—$ to $C_8H_{17}—$ and the other hydrogen, or both R$_1$ and R$_2$ such as alkyl radical, as for example in the commercial stabilizer known as Aerosol OT which has the formula

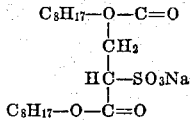

In carrying out the process of the present invention, the fabric is associated with a bath of an agglomerated latex composition as described above until the desired amount of the rubber agglomerates has deposited on the fabric, after which the fabric may be rinsed or washed, and dried. The fabrics may be woven or knitted and may be made of various kinds of fibers, such as silk, wool, cotton, linen, viscose rayon, acetate rayon, synthetic fibers such as nylon, and the like. The process of the present invention is particularly adapted to the treatment of knitted fabrics, such as stockings, where the treatment imparts to the stockings an appearance of having been knit from finer yarns, in addition to enhancing the wearing qualities, and reducing the tendency to run. I have found that in the treatment of knitted fabrics, such as stockings, by the process of the present invention, better snag resistance is obtained than where the same amount of rubber is deposited from a latex in which the rubber particles are in colloidal dispersion. Apparently the larger agglomerates deposited according to the present invention lock better or are more intimately tangled with the yarn intersections of the knitted article. The treatment of the fabric according to the present invention is by a so-called "long" bath procedure where the fabric is introduced into a large excess of an amount of bath necessary to saturate the same, generally, where the weight ratio of treating bath to fabric ranges from 10:1 to 80:1, or over, and the fabric is permitted to remain in the bath until the desired amount of rubber agglomerates are deposited on the fabric. The treating bath may contain up to 2% water-insoluble material, including rubber, compounding ingredients such as sulphur and zinc oxide, fillers such as clay, and the like. The ratio of treating bath to fabric, and the concentration of depositable material in the bath determine the amount of deposit on the fabric. The bath of rubber agglomerates may be acid or non-acid depending on the method of agglomerating the rubber particles. With an acid bath, the rubber agglomerates are firmly anchored or set on deposition, but when the rubber agglomerates are deposited from a non-acid bath, the fibrous material should be made acid or dried before rinsing to permanently set the rubber in the fabric and prevent the agglomerates from being washed out in the rinsing operation.

Various examples of the treatment of fabrics are set forth below, but these are merely exemplary of the invention and are not intended to be limitations thereof.

Example I

The latex compound for use in preparing the treating bath containing the rubber agglomerates was made up according to the following formula:

| | Solids by weight |
|---|---|
| Rubber (as 60% centrifuged ammonia preserved latex) | 100 |
| Sodium hydroxide (as 25% aqueous solution) | 2 |
| "Aquarex D" (as 10% aqueous solution) | 1 |
| Paste (as 35% aqueous paste): | |
| Mercaptobenzothiazole | .5 |
| Dimethylammonium dimethyl dithiocarbamate | .5 |
| Colloidal sulphur | 5 |
| Zinc oxide | 2.5 |
| "BLE" | .5 |
| Glue | .5 |

Water to final total solids of 45%.

The aqueous solutions of sodium hydroxide, and "Aquarex D" were added to the centrifuged latex and to this was added the remaining materials in the form of a 35% aqueous paste, after which the whole was diluted with water to a final total solids of 45%. The "Aquarex D" is a stabilizer having the composition, monosodium sulphate ester of one-half lauryl and one-half myristyl alcohol. The mercaptobenzothiazole and dimethylammonium dimethyl dithiocarbamate are vulcanization accelerators. "BLE" is the trade name of an antioxidant which is a condensation product of acetone and diphenylamine.

Five hundred pounds of an agglomerated latex treating bath at 80° F. were made up as follows. Three hundred and sixty three pounds of water were placed in a container which was a conventional continuously oscillating dyeing machine for silk hosiery. To this were added in the following order, 12 pounds of a 5% solution of "Aquarex D," 16.7 pounds of a 3% gelatin solution, and 3.3 pounds of the 45% latex compound of the above formulation. All the solutions in this and the other examples are aqueous solutions. The treating bath was then agglomerated by the addition of 100 pounds of a 20% solution of ammonium sulphate. On addition of the ammonium sulphate, the dispersed particles in the bath immediately agglomerated and on removing a portion of the bath from the machine in a graduate for inspection the flocs could be seen to settle immediately. Twenty-five pounds of ladies' silk stockings were introduced in the usual cotton bags into the machine and kept in contact with the bath for 10 minutes during which time the rubber aggregates deposited on the goods and left a clear bath. To the bath were then added five pounds of a 10% formic acid solution and the stockings were allowed to remain in the bath for 5 minutes longer to set the rubber agglomerates on the stockings. The stockings were then rinsed in fresh water, removed, the water extracted in a centrifuge, and the stockings dried on heated forms in the usual manner, the rubber deposit being vulcanized by the heat of the forms. The stockings were found to have gained 6% in weight. The same treatment with ladies' woolen stockings likewise gave approximately 6% gain in weight. The stockings had not changed in appearance, nor had the feeling of the same been appreciably altered. The rubber particles were clearly visible under low power magnification, as with a pick counter that magnified about four times. Actual service tests showed that the stockings resisted abrasion and snagging much better than untreated stockings.

Example II

In this case, the latex formulation of Example I was made up into treating baths for ladies' rayon stockings and for ladies' cotton stockings. The agglomerated latex treating bath was made up at 100° F. as follows: 2800 pounds of water were placed in a container which was a conventional paddle dyeing machine for rayon hosiery. The machine was put in operation. To the water, there were added in the following order, 13 pounds of a 10% solution of "Aquarex D," 3.5 pounds of the 45% latex compound of Example I, 3 pounds of a 45% dispersion of clay in water containing 2% "Aquarex D," 16 pounds of a 3% gelatin solution. The bath was then agglomerated by the addition of 180 pounds of a 33⅓% solution of ammonium sulphate. 50 pounds of viscose rayon stockings were introduced into the machine and kept in contact with the bath for 45 minutes. During the contact period, 6 pounds of a 10% formic acid solution were added after 10 minutes running time, 12 pounds more of the 10% acid were added after 20 minutes, and another 12 pounds of the 10% formic acid solution were added after 30 minutes. This fractional addition of acid set the agglomerates on the rayon fiber as they were deposited. The stockings were then rinsed, removed leaving a slightly hazy bath, the water extracted from the treated stockings in a centrifuge, and the stockings dried on heated forms in the usual manner, the rubber deposit being vulcanized by the heat of the forms. The gain in weight of the stockings was found to be 5%. Most of the remainder of the rubber agglomerates had deposited on the cotton bags which held the stockings in the bath. The stockings were more sheer in appearance and the only change in feeling was an improved firmness and body. Laboratory tests indicated decided improvements in elasticity and resistance to snagging. Actual service tests showed that the treated stockings had gained substantially in durability and that the "bagging" incident to the use of rayon in stockings had been nearly eliminated.

The same treatment with cotton stockings gave a gain in weight of approximately 6%.

*Example III*

In this case, the latex formulation of Example I was made up into a treating bath for silk stockings using a different mechanism for agglomerating the rubber particles in the bath and a different stabilizer for protecting the agglomerates. Five hundred pounds of a treating bath were made up at 80° F. as follows: 422 lbs. of water were placed in the continuously oscillating dyeing machine. To this were added in the following order 30 lbs. of a 5% solution of the stabilizer "Igepon T," 5.5 lbs. of the 45% latex compound of Example I, and 10 lbs. of a 20% solution of sodium silicate. The treating bath was then agglomerated by the addition of 15 lbs. of a 20% solution of ammonium alum. The addition of the ammonium alum caused the immediate agglomeration of the dispersed particles in the bath which also occluded the gelatinous aluminum silicate formed by interaction of the alum and sodium silicate. 17.5 lbs. of a 20% solution of tartaric acid were added to the treating bath to acidify the same so that the agglomerates would be fixed or set as they deposited on the fibers without the necessity for a final acid treatment as in Example I to fix them. Twenty-five pounds of silk stockings were introduced into the machine and kept in contact with the bath for 15 minutes after which time the stockings were rinsed in clear water, removed, centrifuged, and dried. The gain in weight was 10%.

*Example IV*

In this case, a different latex formulation from that used in Examples I to III was used, the treating bath was agglomerated by a different method and the agglomerates protected by a different stabilizer.

The latex compound for use in preparing the treating bath was made up according to the following formula:

| | Solids by weight |
|---|---|
| Rubber (as 60% centrifuged ammonia preserved latex) | 100 |
| "Aquarex D" (as 10% aqueous solution) | 1 |
| Paste (as 20% colloid milled aqueous paste): | |
|   "Aquarex D" | 1 |
|   Colloidal sulphur | 3 |
|   Zinc oxide | 5 |
|   Zinc dimethyl dithiocarbamate | 2 |
|   Piperidinium penta methylene dithiocarbamate | 2 |
|   "Agerite White" | 2 |
|   Glue | .16 |
|   Gum arabic (as 10% aqueous solution) | 10 |

Water to final total solids of 35%.

The aqueous solution of "Aquarex D" was added to the centrifuged latex and to this was added the remaining materials in the form of a 25% paste, after which the whole was diluted with water to a final total solids of 35%. The zinc dimethyl dithiocarbamate and the piperidinium pentamethylene dithiocarbamate are vulcanization accelerators. "Agerite White" is an antioxidant of the composition symmetrical di-beta-naphthyl-para-phenylene-diamine.

Five hundred pounds of a treating bath were made up as follows at 85° F.: 405 lbs. of water were placed in the oscillating dyeing machine for silk stockings. To this were added in the following order, 40 lbs. of a 5% solution of the commercial stabilizer "Nacconal NR," 7 lbs. of the above 35% latex compound, 5.5 lbs. of a 45% dispersion of clay in water containing 2% "Aquarex D." The stabilizer "Nacconal NR" is a sodium alkylaryl sulphonate. The treating bath was agglomerated by the addition of 25 lbs. of a 20% aqueous solution of magnesium acetate. 17.5 lbs. of a 20% solution of formic acid were added to acidify the treating bath. Twenty-five pounds of silk stockings were introduced into the machine, and kept in contact with the bath for 15 minutes, after which time the bath was clear. The stockings were rinsed, removed, centrifuged and dried. The gain in weight was 20%.

The above examples clearly illustrate the present invention and it will be obvious to those skilled in the art that fabrics may be treated with various treating baths of other agglomerated latex compositions using the principles of the present invention. In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The process of treating fabrics which comprises immersing a fabric in an aqueous bath of an agglomerated latex composition in which the rubber agglomerates are in the form of composite particles comprising rubber and compounding ingredients which are macroscopic and readily separable as such composite particles from the aqueous medium on standing, the weight ratio of said bath to said fabric being between 10:1 and 80:1 and said bath being capable of depositing its rubber agglomerates on said fabric on contact therewith, and maintaining said fabric associated with said agglomerated latex composition until the desired amount of composite particles has deposited on the fabric.

2. The process of treating fabrics which comprises immersing a fabric in an aqueous bath of an agglomerated latex composition in which the rubber agglomerates are in the form of composite particles comprising rubber and sulphur and zinc oxide which are macroscopic and readily separable as such composite particles from the aqueous medium on standing, the weight ratio of said bath to said fabric being between 10:1 and 80:1 and said bath being capable of depositing its rubber agglomerates on said fabric on contact therewith, and maintaining said fabric associated with said agglomerated latex composition until the desired amount of composite particles has deposited on the fabric.

3. The process of treating fabrics which comprises immersing a fabric in an aqueous bath of an agglomerated latex composition in which the rubber agglomerates are in the form of composite particles comprising rubber and clay which are macroscopic and readily separable as such composite particles from the aqueous medium on standing, the weight ratio of said bath to said fabric being between 10:1 and 80:1 and said bath being capable of depositing its rubber agglomerates on said fabric on contact therewith, and maintaining said fabric associated with said agglomerated latex composition until the desired amount of composite particles has deposited on the fabric.

4. The process of treating fabrics which comprises immersing a fabric in an aqueous bath of an agglomerated latex composition in which the rubber agglomerates are in the form of composite particles comprising rubber and compounding ingredients which are macroscopic and readily separable as such composite particles from the aqueous medium on standing, the weight ratio of said bath to said fabric being between 10:1 and 80:1 and said bath containing sufficient protective to prevent the rubber agglomerates from completely coagulating into a coherent lump but insufficient protective to prevent the agglomerates from depositing on the fabric, and maintaining said fabric associated with said agglomerated latex composition until the desired amount of composite particles has deposited on the fabric.

5. The process of treating fabrics which comprises immersing a fabric in an aqueous bath of an agglomerated latex composition in which the rubber agglomerates are in the form of composite particles comprising rubber and sulphur and zinc oxide which are macroscopic and readily separable as such composite particles from the aqueous medium on standing, the weight ratio of said bath to said fabric being between 10:1 and 80:1 and said bath containing sufficient protective to prevent the rubber agglomerates from completely coagulating into a coherent lump but insufficient protective to prevent the agglomerates from depositing on the fabric, and maintaining said fabric associated with said agglomerated latex composition until the desired amount of composite particles has deposited on the fabric.

6. The process of treating fabrics which comprises immersing a fabric in an aqueous bath of an agglomerated latex composition in which the rubber agglomerates are in the form of composite particles comprising rubber and clay which are macroscopic and readily separable as such composite particles from the aqueous medium on standing, the weight ratio of said bath to said fabric being between 10:1 and 80:1 and said bath containing sufficient protective to prevent the rubber agglomerates from completely coagulating into a coherent lump but insufficient protective to prevent the agglomerates from depositing on said fabric, and maintaining said fabric associated with said agglomerated latex composition until the desired amount of composite particles has deposited on the fabric.

7. The process of treating fabrics which comprises immersing a fabric in an aqueous bath of an agglomerated latex composition in which the agglomerates are macroscopic, said bath being capable of depositing its rubber agglomerates on said fabric on contact therewith, and maintaining said fabric associated with said agglomerated latex composition until the desired amount of rubber agglomerates has deposited on the fabric.

8. The process of treating fabrics which comprises immersing a fabric in an aqueous bath of an agglomerated latex composition in which the agglomerates are macroscopic, said bath containing sufficient protective to prevent the rubber agglomerates from completely coagulating into a coherent lump but insufficient protective to prevent the agglomerates from depositing on said fabric, and maintaining said fabric associated with said agglomerated latex composition until the desired amount of rubber agglomerates has deposited on the fabric.

9. The process of treating fabrics which comprises immersing a fabric in an aqueous bath of an agglomerated latex composition containing up to 2% water-insoluble material and in which the rubber agglomerates are in the form of composite particles comprising rubber and compounding ingredients which are macroscopic and readily separable as such composite particles from the aqueous medium on standing, the weight ratio of said bath to said fabric being between 10:1 and 80:1 and said bath being capable of depositing its rubber agglomerates on said fabric on contact therewith, and maintaining said fabric associated with said agglomerated latex composition until the desired amount of composite particles has deposited on the fabric.

10. The process of treating fabrics which comprises immersing a fabric in an aqueous bath of an agglomerated latex composition containing up to 2% water-insoluble material and in which the rubber agglomerates are in the form of composite particles comprising rubber and sulphur and zinc oxide which are macroscopic and readily separable as such composite particles from the aqueous medium on standing, the weight ratio of said bath to said fabric being between 10:1 and 80:1 and said bath being capable of depositing its rubber agglomerates on said fabric on contact therewith, and maintaining said fabric associated with said agglomerated latex composition until the desired amount of composite particles has deposited on the fabric.

11. The process of treating fabrics which comprises immersing a fabric in an aqueous bath of an agglomerated latex composition containing up to 2% water-insoluble material and in which the rubber agglomerates are in the form of composite particles comprising rubber and clay which are macroscopic and readily separable as such composite particles from the aqueous medium on standing, the weight ratio of said bath to said fabric being between 10:1 and 80:1 and said bath being capable of depositing its rubber agglomerates on said fabric on contact therewith, and maintaining said fabric associated with said agglomerated latex composition until the desired amount of composite particles has deposited on the fabric.

12. The process of treating fabrics which comprises immersing a fabric in an aqueous bath of an agglomerated latex composition containing up to 2% water-insoluble material and in which the rubber agglomerates are in the form of composite particles comprising rubber and compounding ingredients which are macroscopic and readily separable as such composite particles from the aqueous medium on standing, the weight ratio of said bath to said fabric being between 10:1 and 80:1 and said bath containing sufficient protective to prevent the rubber agglomerates from completely coagulating into a coherent lump but insufficient protective to prevent the agglomerates from depositing on the fabric, and maintaining said fabric associated with said agglomerated latex composition until the desired amount of composite particles has deposited on the fabric.

13. The process of treating fabrics which comprises immersing a fabric in an aqueous bath of an agglomerated latex composition containing up to 2% water-insoluble material and in which the rubber agglomerates are in the form of composite particles comprising rubber and sulphur and zinc oxide which are macroscopic and readily separable as such composite particles from the aqueous medium on standing, the weight ratio of said bath to said fabric being between 10:1 and 80:1 and said bath containing sufficient protective to prevent the rubber agglomerates from completely coagulating into a coherent lump but insufficient protective to prevent the agglomerates from depositing on the fabric, and maintaining said fabric associated with said agglomerated latex composition until the desired amount of composite particles has deposited on the fabric.

14. The process of treating fabrics which comprises immersing a fabric in an aqueous bath of an agglomerated latex composition containing up to 2% water-insoluble material and in which the rubber agglomerates are in the form of composite particles comprising rubber and clay which are macroscopic and readily separable as such composite particles from the aqueous medium on standing, the weight ratio of said bath to said fabric being between 10:1 and 80:1 and said bath containing sufficient protective to prevent the rubber agglomerates from completely coagulating into a coherent lump but insufficient protective to prevent the agglomerates from depositing on said fabric, and maintaining said fabric associated with said agglomerated latex composition until the desired amount of composite particles has deposited on the fabric.

15. The process of treating fabrics which comprises immersing a fabric in an aqueous bath of an agglomerated latex composition containing up to 2% water-insoluble material and in which the agglomerates are macroscopic, said bath being capable of depositing its rubber agglomerates on said fabric on contact therewith, and maintaining said fabric associated with said agglomerated latex composition until the desired amount of rubber agglomerates has deposited on the fabric.

16. The process of treating fabrics which comprises immersing a fabric in an aqueous bath of an agglomerated latex composition containing up to 2% water-insoluble material and in which the agglomerates are macroscopic, said bath containing sufficient protective to prevent the rubber agglomerates from completely coagulating into a coherent lump but insufficient protective to prevent the agglomerates from depositing on said fabric, and maintaining said fabric associated with said agglomerated latex composition until the desired amount of rubber agglomerates has deposited on the fabric.

HOWARD A. YOUNG.